(12) United States Patent
Wakitani et al.

(10) Patent No.: US 8,900,058 B2
(45) Date of Patent: Dec. 2, 2014

(54) OPERATING APPARATUS FOR GAME MACHINE

(71) Applicants: Noboru Wakitani, Kyoto (JP); Junji Takamoto, Kyoto (JP); Takeshi Nagareda, Kyoto (JP); Kuniaki Ito, Kyoto (JP); Hideo Nagata, Kyoto (JP); Hiroshi Igarashi, Tokyo (JP); Akio Onda, Tokyo (JP)

(72) Inventors: Noboru Wakitani, Kyoto (JP); Junji Takamoto, Kyoto (JP); Takeshi Nagareda, Kyoto (JP); Kuniaki Ito, Kyoto (JP); Hideo Nagata, Kyoto (JP); Hiroshi Igarashi, Tokyo (JP); Akio Onda, Tokyo (JP)

(73) Assignees: Nintendo Co., Ltd., Kyoto (JP); Kabushiki Kaisha Bandai Namco Games, Tokyo (JP)

( * ) Notice: Subject to any disclaimer, the term of this patent is extended or adjusted under 35 U.S.C. 154(b) by 0 days.

(21) Appl. No.: 13/790,428

(22) Filed: Mar. 8, 2013

(65) Prior Publication Data

US 2013/0190091 A1 Jul. 25, 2013

Related U.S. Application Data

(63) Continuation of application No. 12/149,332, filed on Apr. 30, 2008, now Pat. No. 8,439,753, which is a continuation of application No. 10/937,411, filed on Sep. 10, 2004, now Pat. No. 7,479,064.

(30) Foreign Application Priority Data

Sep. 12, 2003 (JP) ................................ 2003-320801

(51) Int. Cl.
*A63F 13/00* (2014.01)

(52) U.S. Cl.
USPC .............................................. 463/30; 463/40

(58) Field of Classification Search
USPC ........................................................ 463/42, 31
See application file for complete search history.

(56) References Cited

U.S. PATENT DOCUMENTS

| 4,501,424 A | * | 2/1985 | Stone et al. | ............... 273/148 B |
| 5,016,843 A | | 5/1991 | Ward | |

(Continued)

FOREIGN PATENT DOCUMENTS

| GB | 2393316 A | 3/2004 |
| JP | 04-225413 | 8/1992 |

(Continued)

OTHER PUBLICATIONS

Office Action issued for Japanese Patent Application 2008-202537, dated Jan. 5, 2011.

(Continued)

*Primary Examiner* — Masud Ahmed
(74) *Attorney, Agent, or Firm* — Nixon & Vanderhye PC

(57) ABSTRACT

An operating apparatus for game machine includes a depressing member. A main body of the depressing member is provided with three engaging protrusions and two depressing protrusions that downwardly protrude. For example, the two depressing protrusions are provided between the three engaging protrusions. In response to a beating operation, the right side of the depressing member is depressed, and an engaging portion of the engaging protrusion at the left side is engaged with a rear surface of an upper surface panel. Accordingly, the depressing member depressed at the right side without being upwardly actuated, and a rubber switch depressed by the depressing protrusion is brought into contact with a board. At this time, a contact provided on the board and a contact provided on the rubber switch are brought into contact with each other, and an operation signal according to the beating operation is output to the game machine.

20 Claims, 13 Drawing Sheets

(56) References Cited

U.S. PATENT DOCUMENTS

| | | |
|---|---|---|
| 5,421,590 A | 6/1995 | Robbins |
| 5,667,220 A | 9/1997 | Cheng |
| 5,739,457 A | 4/1998 | Devecka |
| 5,929,809 A | 7/1999 | Erlick et al. |
| 5,929,844 A | 7/1999 | Barnes |
| 6,478,679 B1 | 11/2002 | Himoto et al. |
| 6,540,614 B1 * | 4/2003 | Nishino et al. .................. 463/40 |
| 6,645,067 B1 | 11/2003 | Okita et al. |
| 6,714,189 B2 | 3/2004 | Collins |
| 6,952,197 B1 | 10/2005 | Nakamura et al. |
| 7,405,353 B2 | 7/2008 | Kiyono et al. |
| 7,479,064 B2 | 1/2009 | Wakitani et al. |
| 2001/0012795 A1 | 8/2001 | Asami et al. |
| 2003/0114214 A1 | 6/2003 | Barahona et al. |
| 2005/0056997 A1 | 3/2005 | Wakitani et al. |
| 2008/0242412 A1 | 10/2008 | Wakitani et al. |

FOREIGN PATENT DOCUMENTS

| | | |
|---|---|---|
| JP | 11-232028 | 8/1999 |
| JP | 2000-148136 | 5/2000 |
| JP | 2000-157736 | 6/2000 |
| JP | 2000-172377 | 6/2000 |
| JP | 2000-176176 | 6/2000 |
| JP | 2001-067070 | 3/2001 |
| JP | 2001-069427 | 3/2001 |
| JP | 2001-170352 | 6/2001 |
| JP | 3080103 | 6/2001 |
| JP | 2001-276421 | 10/2001 |
| JP | 2001-321564 | 11/2001 |
| JP | 2001-325055 | 11/2001 |
| JP | 2001-327754 | 11/2001 |
| JP | 2002-011243 | 1/2002 |
| JP | 2002-078970 | 3/2002 |
| JP | 2002-123353 | 4/2002 |
| JP | 2002-202853 | 7/2002 |
| JP | 2002-218558 | 8/2002 |
| JP | 2002-239233 | 8/2002 |
| JP | 2002-248261 | 9/2002 |
| JP | 2002-351489 | 12/2002 |
| JP | 2003-154173 | 5/2003 |
| WO | WO 98/02223 | 1/1998 |
| WO | 99/19036 | 4/1999 |
| WO | WO 00/31605 | 6/2000 |

OTHER PUBLICATIONS

Office Action issued in corresponding Japanese Application No. 2003-320801 on Jan. 8, 2008.

Office Action dated Jun. 10, 2008 issued in corresponding JP Application No. 2003-320801 w/ partial English-language translation.

* cited by examiner

OPERATION SIGNAL

| | b7 | b6 | b5 | b4 | b3 | b2 | b1 | b0 |
|---|---|---|---|---|---|---|---|---|
| (000)Tx | | | | | | | | |
| 1st byte | 0 | 0 | ORG_CH | START | Y | X | B | A |
| 2nd byte | FIN | L | R | Z | UP | DOWN | RIGHT | LEFT |
| 3rd byte | CONTROL STICK ANALOG X[7:0] | | | | | | | |
| 4th byte | CONTROL STICK ANALOG Y[7:0] | | | | | | | |
| 5th byte | C STICK ANALOG X[7:0] | | | | | | | |
| 6th byte | C STICK ANALOG Y[7:0] | | | | | | | |
| 7th byte | L TRIGGER[7:0] | | | | | | | |
| 8th byte | R TRIGGER[7:0] | | | | | | | |

OPERATING APPARATUS FOR GAME MACHINE

CROSS-REFERENCES TO RELATED APPLICATIONS

This application is a continuation of application Ser. No. 12/149,332 filed Apr. 30, 2008, which is a continuation of application Ser. No. 10/937,411 filed Sep. 10, 2004, now U.S. Pat. No. 7,479,064, which claims priority to Japanese Application No. 2003-320801 filed Sep. 12, 2003, the entire contents of each of which are hereby incorporated by reference in this application.

FIELD OF THE INVENTION

Certain exemplary embodiments relate to operating apparatus for game machines. More specifically, certain exemplary embodiments relate to an operating apparatus for a game machine that outputs an operation signal to a game machine in response to a beating (i.e., percussion) operation by an operator.

BACKGROUND AND SUMMARY OF THE INVENTION

An example of this kind of a conventional operating apparatus for a game machine is disclosed in Japanese Patent Laying-open No. 2001-276421 [A63F 13/00, A63F 13/06, G10H 1/34, H01H 13/18] laid-open on Oct. 9, 2001. The input device for a game machine is provided with a plurality of input areas each of which has a pressure sensor and a vibration sensor. Then, when the input area is beaten, a different sound for each input area is generated.

Another example of this kind of an operating apparatus for a game machine is disclosed in Japanese Patent Laying-open No. 2000-157736 [A63F 13/00, G06F 1/16, G06F 3/02, G06K 17/00, G06K 19/00] laid-open on Jun. 13, 2000. In the PC-card-shaped input device for a game, a concave portion is provided at side walls of a housing having a PC card standardized size, and a signal cable is wrapped around the concave portion. Thus, it is possible to house the PC-card-shaped input device in a card slot of a notebook computer, and this allows the input device to be easily portable together with the notebook personal computer.

The other example of this kind of an operating apparatus for a game machine is disclosed in Japanese Patent Laying-open No. 2000-172377 [G06F 1/18, G06F 1/16, G06F 15/02] laid-open on Jun. 23, 2000. The electronic equipment is provided with a cable that is fixed to the equipment at one end and has a connector to be connected at the other end, and a housing portion capable of housing the cable and the connector. A cable housing part of the housing portion has a housing groove with a width that is able to house the cable snaking at a bending radius more than a permissible bending radius of a cable. Thus, the cable is held by a restoring force of the cable housed in the snaking groove in a normal state.

However, in the above-described input device for a game machine, the pressure sensor and the vibration sensor are provided to each of the plurality of input areas, and therefore, the device itself is expensive. In such an input device, it may be possible that a membrane switch is applied. However, a problem occurs when a membrane switch is applied. A relatively high load needs to be applied per unit area, causing a difficulty in operation when playing the game.

In the above-described PC-card-shaped input device for game, a problem still remains. If the PC card is also carried together with the notebook computer in addition to the PC-card-shaped input device for game, the PC-card-shaped input device for game cannot be housed within the card slot, and cannot be put in a computer bag because it is bulky. In such a case, further problems occur because the PC-card-shaped input device has to be carried separately, therefore, the cable can become disengage due to the weight of the connector, making transportation difficult.

In the above-described electronic equipment, due to the space required for forming the snaking groove, the housing increases in size, causing a problem. Another problem is that if the bending radius of the snaking groove is set to an optimum value, the cable is easily disengaged, or the cable is easily broken due to an excessive load (stress), causing difficulties with the equipment's practicality.

Therefore, it is a primary feature of the illustrative embodiments to provide a novel operating apparatus for a game machine.

Another feature of the illustrative embodiments is to provide an input apparatus for a game machine capable of input from a small load and costing less.

Another feature of the illustrative embodiments is to provide an operating apparatus for a game machine capable of assuredly housing a cable and a connector with a simple structure and reducing the size of the input apparatus itself.

An operating apparatus for a game machine according to an illustrative embodiment is used by being connected to a game machine. The operating apparatus for a game machine, comprising: a housing provided with a plurality of holes on its surface; an operation input portion that is provided on an upper surface of the housing and is elastically changed in response to a beating operation by an operator; a depressing member that is placed between the housing and the operation input portion, on which a plurality of engaging protrusions that engage an inside wall of the housing through the holes of the housing are provided at both ends thereof in such a manner as to be downwardly protruded, and on which a plurality of depressing protrusions are provided in such a manner as to protrude downward between the plurality of engaging protrusions; a board housed within the housing; at least more than one elastic member that is housed within the housing such that its surface is exposed through the hole of the housing, arranged at a position opposed to the depressing protrusion, and has a rear surface that is opposed to the board; a first contact formed on the rear surface of the elastic member; a second contact formed in a manner so as to oppose the first contact on the board, wherein the depressing member is depressed in response to a beating operation by the operator, the elastic member is depressed by the depressing protrusion, the first contact is brought into contact with the second contact, whereby an operation signal is output.

More specifically, the operating apparatus for a game machine (10: a reference numeral corresponding in the "preferred embodiment" described later) is connected to the game machine, and used for selecting a game or operating the game. The housings (14, 16) of the operating apparatus for a game machine (10) each have the plurality of holes (30a, 30b, 120b). The operation input portions (20, 22) respectively provided on the upper surfaces of the housings (14, 16) are elastically changed according to a beating operation by the operator. The depressing members (32, 34) are provided between each of the housings (14, 16) and each of the operation input portions (20, 22). The depressing members (32, 34) are provided with the plurality of engaging protrusions (32b, 34b) that engage the inside wall (rear surface of an upper surface panel 120a in this embodiment) of each of the housings (14, 16) through the holes (30a, 120b) of the housing at both ends thereof such that they are downwardly protruded. Furthermore, the depressing members (32, 34) are provided with the plurality of depressing protrusions (32c, 34c) in such a manner as to be downwardly protruded between the plurality of engaging protrusions (32b, 34b). The housings (14, 16) each house the boards (24, 26). At least more than one elastic member (28) that is housed within each of the housings (14, 16) such that its surface is exposed through the hole (30b) of each of the housings (14, 16) at a position opposed to the depressing protrusions (32c, 34c) is provided to be opposed to the board (24, 26). That is, the depressing members (32, 34) are supported by the elastic members (28). The first contacts (28a) are provided on the rear surface of the elastic members (28), and the second contacts (24a and 26a) are provided on the boards (24, 26) respectively in such a manner as to be opposed to the first contacts (28a). For example, when the depressing members (32, 34) are depressed in response to the beating operation by the operator (such as a player or a user), the engaging protrusions (32b, 34b), except for the depressed part and its surrounding, engages the inside surface of the housing (14, 16). Accordingly, the depressing members (32, 34) are depressed without being upwardly actuated, the elastic member (28) is depressed by the depressing protrusions (32c, 34c), and the first contacts (28a) and the second contacts (24a and 24b) are brought into contact with each other. This allows an operation signal to be output to the game machine.

According to an illustrative embodiment, it is possible to prevent the depressing members from being upwardly actuated by the engaging protrusions, and therefore, even if the operator beats any place of the operation input portion, the depressing protrusions assuredly depresses the elastic member, capable of outputting the same operation signal. Therefore, it is possible to improve operational abilities. Furthermore, the depressing members are supported by only the elastic members, which makes it possible to operate with a relatively low load.

In one aspect of an illustrative embodiment, an operating apparatus for a game machine, further comprising: a cable that is connected to the inside of the housing at one end and has a connector to be connected to the game machine at other end; a first housing concave portion formed on the other main surface of the housing and houses the cable and the connector, wherein the first housing concave portion is provided with a plurality of pinch protrusions for pinching both sides of the cable at a position where the cable is housed. More specifically, the operating apparatus for game machine (10) is connected to the game machine (100) by the cable (38). The cable (38) is connected to the inside of the housing (14 or 16; the third housing 18 in this embodiment) at the one end and has a connector (36) to be connected to the game machine (100) at the other end. On the other main surface (124) of each of the housings (14, 16), the first housing concave portion (124a) for housing the cable (38) and the connector (36) is provided. The first housing concave portion (124a) is provided with the plurality of pinch protrusions (124b) for pinching the both sides of the cable (38) at the position where the cable (38) is housed. Thus, the first housing concave portion is provided with the pinch protrusions for pinching both sides of the cable so that it is possible to prevent the cable from being disengaged and capable of housing and holding the cable and the connector with a simple structure. Furthermore, it is possible to reduce the size of the apparatus itself when it is stored.

In one illustrative embodiment, the plurality of pinch protrusions are formed in such a manner as to be shifted from each other on both side surfaces of the first housing concave portion. More specifically, the plurality of pinch protrusions (124b) are formed in such a manner as to be shifted from each other on both side surfaces of the first housing concave portion (124a). Accordingly, the cable (38) is held as if it snakes by the plurality of pinch protrusions (124b). Thus, by the restoring force of the cable to the normal state, the cable and the connector are sure to be held. This allows the operating apparatus for a game machine to be easily portable.

In another illustrative embodiment, an operating apparatus for a game machine, wherein, the operation input portion has a first operation input portion and a second operation input portion, the housing includes a first housing provided with the first operation input portion, and a second housing provided with the second operation input portion and having approximately the same size as the first housing, and a third housing to be coupled with the first housing and the second housing and being smaller than the first housing and the second housing, wherein the first housing concave portion is formed on at least one of the first housing and the second housing, the second housing concave portion is formed due to a difference between a size of the first housing and the second housing and a size of the third housing, the cable extends from the third housing, the cable is wrapped around the third housing so as to be housed within the second housing concave portion, the connector and a part of the cable are fitted into the first concave portion, and whereby, the cable and the connector are housed and held. More specifically, the operation input portion (20, 22) includes the first operation input portion (20) and the second operation input portion (22). The housing (14, 16, 18) consists of the first housing (14), the second housing (16), and the third housing (18). The first housing (14) is provided with the first operation input portion (20). The second housing (16) has approximately the same size (shape) as the first housing (14), and the second housing (16) is provided with the second operation input portion (22). The third housing (18) couples the first housing (14) and the second housing (16), and is smaller than them. The difference in size provides the second concave portion, that is, a narrow part (128) to the operating apparatus for a game machine (10), and the cable (38) extends from the third housing (18). Accordingly, the cable (38) is wrapped around the third housing (18) so as to be housed within the second housing concave portion (128), and then, the connector (36) and a part of the cable (38) are fitted into the first housing concave portion (124a), and whereby, the cable (38) and the connector (36) are housed and held. Thus, the cable is wrapped around the second housing concave portion, and part of the cable and the connector are fitted into the first housing concave portion. Therefore, this makes it possible to prevent the cable and the connector from being disengaged from the housing, so the cable and connector are capable of being effectively housed.

In another illustrative embodiment, an operating apparatus for the game machine, wherein the first operation input portion and the second operation input portion are respectively provided on upper surfaces of the first housing and the second housing, and the first housing concave portion is formed on the bottom surface of at least one of the first housing and the second housing. More specifically, the first operation input portion (20) is provided on the upper surface of the first housing (14), and the second operation input portion (22) is provided on the upper surface of the second housing (16). On the other hand, the first housing concave portion (124a) is provided on the bottom surface (124) of the first housing (14) or the bottom surface (124) of the second housing (16) or the both thereof. That is, the first housing concave portion is provided on the bottom surface of the housing, capable of preventing the concave portion from being conspicuous when using the operating apparatus for a game machine.

In another illustrative embodiment, an operating apparatus for a game machine, further comprising: a first connecting means formed on the third housing; and a second connecting means detachably connected to the first connecting means and formed on the second housing, wherein when the first connecting means and the second connecting means are directly connected with each other, the first housing and the second housing can be utilized as one operating apparatus for a game machine, and when the first connecting means and the second connecting means are indirectly connected, the first housing and the second housing are separately used as two operating apparatuses for game machine. More specifically, the first connecting means (18a) is formed on the third housing (18), and the second connecting means (16a) is formed on the second housing (16). The first connecting means (18a) and the second connecting means (16a) are detachably connected with each other. For example, when the first connecting means (18a) and the second connecting means (16a) are directly connected with each other, the first housing (14) and the second housing (16) can be used as one operating apparatus for a game machine. On the other hand, when the first connecting means (18a) and the second connecting means (16a) are indirectly connected by the connecting cable (40) and so on, the first housing (14) and the second housing (16) can be used separately as two operating apparatuses for a game machine (10a, 10b). Thus, the first housing and the second housing are detachably connected, and this allows one operating apparatus for a game machine to be used separately as two apparatuses. Accordingly, if two players enjoy playing a game for example, each player's ability to operate is not reduced.

In another illustrative embodiment, in a situation where the first housing and the second housing are used separately as two operating apparatuses for a game machine, a connecting cable for connecting to the first connecting means is detachably connected to the second connecting means. More specifically, in a situation where the first housing (14) and the second housing (16) are used separately as two operating apparatuses for a game machine, the connecting cable (40) for connecting to the first connecting means (18a) is detachably connected to the second connecting means (16a). That is, an operation signal from the operation input portion (22) of the second housing (22) is input to the game machine (100) through the third housing (18). Accordingly, in a situation where the first housing and the second housing are used separately from each other, the first connecting means and the second connecting means can detachably be connected with the cable.

In another illustrative embodiment, an operating apparatus for a game machine, further comprising: a sound input portion provided on an upper surface of the third housing for inputting a sound to be generated by the operator, wherein an operation signal according to a sound input by the sound input portion is output. More specifically, the sound input portion (66) such as a microphone is provided on the upper surface of the third housing (18) to output the operation signal corresponding to the sound of clapping or a voice by the operator. It is noted that the sound input portion (66) does not need to be provided on the upper surface of the third housing (18), and this may alternatively be provided at an area where it is easy for the operator to input his clapping and voice except for where the operation input portions (20, 22) will be subjected to the beating operation. Accordingly, an operation signal by the beating operation as well as an operation signal by the sound such as clapping can be output, and this extends the range of an operation, capable of realizing more complex and interesting operations.

An operating apparatus for a game machine according to another illustrative embodiment is used by being connected to the game machine. The operating apparatus for a game machine comprises a housing; an operation input portion provided on one main surface of the housing; a cable that is connected to an inside of the housing at one end and has a connector to be connected to the game machine at other end; a housing concave portion formed on the other main surface of the housing, that houses the cable and the connector, wherein the housing concave portion is provided with a plurality of protrusions for pinching both sides of the cable at a position where the cable is housed.

In this illustrative embodiment, similar to the above-described illustrative embodiment, it is possible to house and hold the cable and the connector with a simple structure which prevents the cable from being disengaged, thereby reducing the size of the apparatus.

An operating apparatus for a game machine according to the other illustrative embodiment is used by being connected to the game machine. The operating apparatus for a game machine, comprising: a first housing provided with a first operation input portion on its main surface; a second housing provided with a second operation input portion on its main surface; a first connecting means formed in the first housing; a second connecting means that is detachably connected to the first connecting means and is formed on the second housing, wherein when the first connecting means and the second connecting means are directly connected with each other, the first housing and the second housing can be utilized as one operating apparatus for game machine, and when the first connecting means and the second connecting means are indirectly connected, the first housing and the second housing are used separately as two operating apparatuses for a game machine.

In the other illustrative embodiment also, similarly to the above-described illustrative embodiment, the first housing and the second housing are detachably connected with each other. This allows one operating apparatus for a game machine to be used separately as two operating apparatuses for a game machine.

In another aspect of the illustrative embodiment, an operating apparatus for a game machine, further comprising: a first cable connected to an inside of the first housing at one end and having a connector to be connected to the game machine at the other end; a second cable detachably connected to the second connecting means at one end and having a connector to be connected to the first connecting means at other end, wherein, in a situation where the first housing and the second housing are used separately as two operating apparatuses for a game machine, the second cable is detachably connected to the second connecting means.

In this illustrative embodiment also, similarly to the above-described illustrative embodiment, in a situation where the first housing and the second housing are used separately, the first connecting means and the second connecting means can be detachably connected by the cable.

An operating apparatus for a game machine according to another illustrative embodiment is used by being connected to the game machine. The operating apparatus for a game machine, comprising: a housing; a beating operation input portion that is provided on one main surface of the housing and elastically changed according to a beating operation by an operator; a sound input portion provided on an area different from an area provided with the beating operation input portion of the housing and for inputting a sound generated by the operation; and an operation signal transmitting means for transmitting to the game machine at least any one beating operation signal to be output in response to the beating operation at the beating operation input portion and the sound generating operation signal to be output in response to a sound input by the sound input portion.

In this illustrative embodiment also, similarly to the above-described illustrative embodiment, an operation signal by the beating operation as well as a sound generation signal by the sound such as clapping can be output, and this extends the range of an operation, capable of realizing more complex and interesting operations.

The above described features and other features, aspects and advantages will become more apparent from the following detailed description when taken in conjunction with the accompanying drawings.

BRIEF DESCRIPTION OF THE DRAWINGS

FIG. 10 is an illustrative view showing a format of an operation signal to be input to the game machine from the operating apparatus for the game machine shown in FIG. 1;

DETAILED DESCRIPTION OF THE PREFERRED EMBODIMENTS

Figure 1:
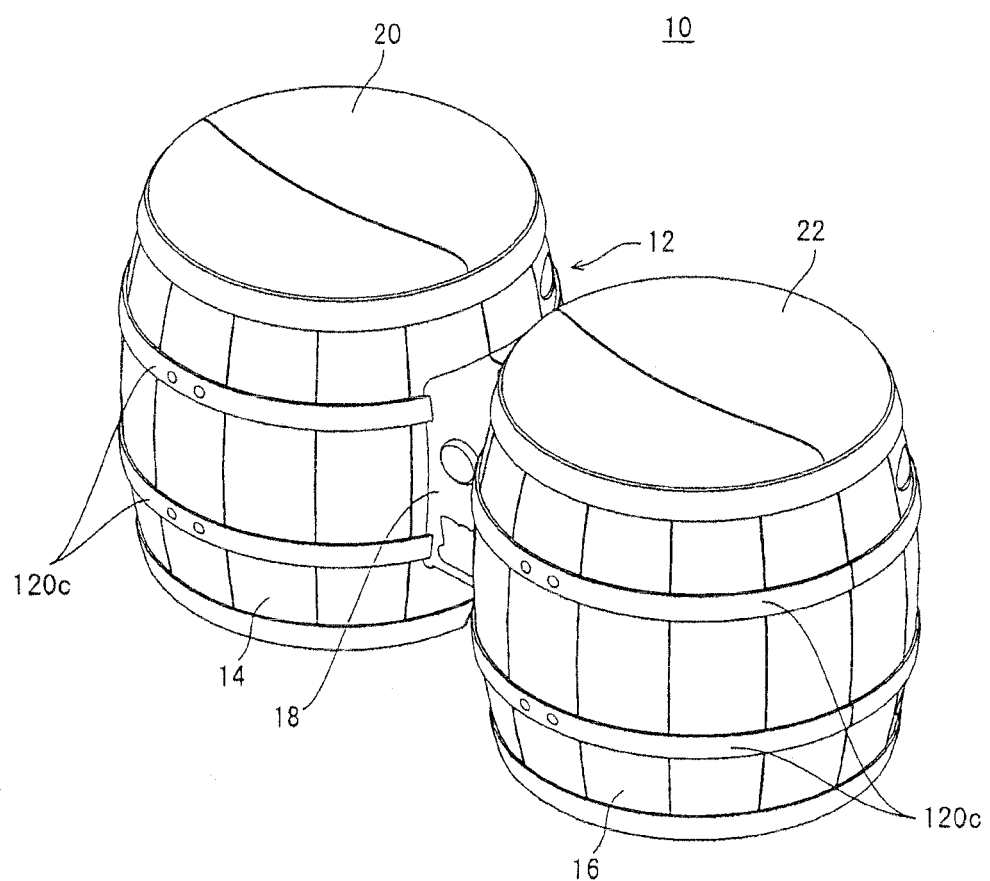
FIG. 1 is an illustrative view showing an operating apparatus for a game machine of one embodiment of the present invention.

Referring to FIG. 1, an operating apparatus for a game machine 10 (hereinafter, to be referred as "operating apparatus") of one embodiment of the present invention is in the form of percussion musical instruments (conga or drum). The operating apparatus 10 includes a body 12, and the body 12 consists of a first housing 14 in the form of a barrel, a second housing 16 having approximately the same size and the same shape as the first housing 14, and a third housing 18 that couples the first housing 14 and the second housing 16, is formed in the form of quadratic prism (a rectangular parallelepiped), and is smaller than the first housing 14 and the second housing 16.

Furthermore, on the upper surface (top surface) of the first housing 14 and the second housing 16, covers 20 and 22 are respectively provided. Areas covered by the covers 20 and 22 are areas (operating areas) or operation input portions to be operated (beaten) by a player or a user. That is, the operating apparatus 10 has two operation input portions on the upper surface of the first housing 14 and on the upper surface of the second housing 16. For example, the covers 20 and 22 are made of rubber, and elastically changed in shape according to a beating operation by the player or the user, and then restored to an original shape.

It is noted that although illustration is omitted in FIG. 1, on the upper surface of the third housing 3, a microphone 62 (see FIG. 9) or hole for collecting sounds into the microphone 62 is provided. In a case of providing the hole for collecting sounds, the microphone 62 is set inside of the third housing 18 or is set such that its sound collecting portion is exposed from the hole. It is noted that the microphone 62 is provided within the third housing 18 in this embodiment. However, it may be provided in the first housing 14 or the second housing 16 except for within its operating area to be operated by the user (operation input portion).

Figure 2:
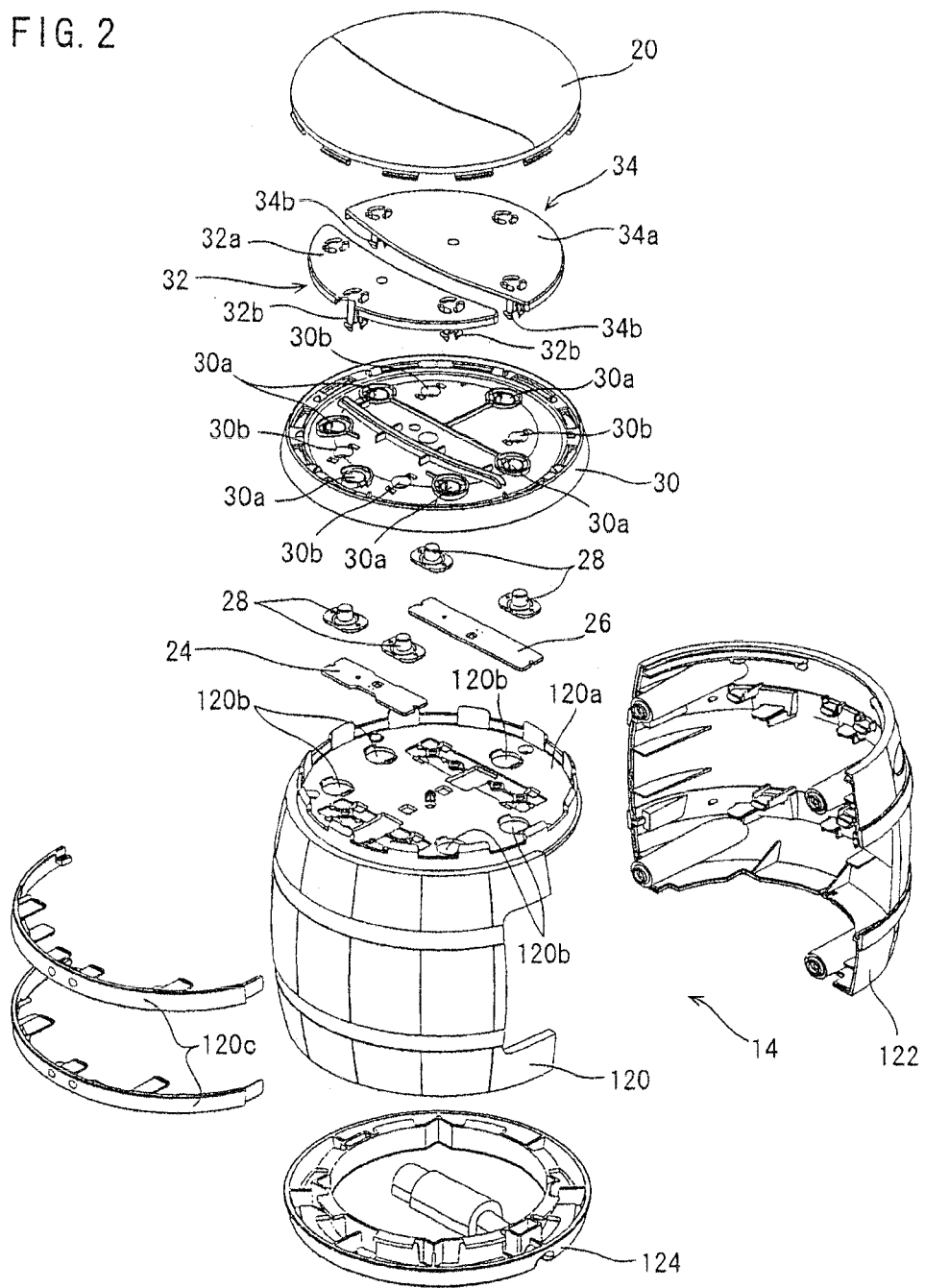
FIG. 2 is an exploded view showing a part of the operating apparatus for a game machine shown in FIG. 1.

FIG. 2 shows an exploded view of a part of the operating apparatus 10. That is, this is an exploded view as to the first housing 14, and for the sake of simplicity, this is omitted as to the second housing 16 and the third housing 18. It is noted that the second housing 16 is approximately symmetrically formed with the first housing 14.

Referring to FIG. 2, a part of the body 12 consists of a front surface panel 120, a back surface panel 122, and a bottom surface panel 124. The front surface panel 120 includes an upper surface (top surface) panel 120a, and on the upper surface panel 120a, a plurality of holes (five, in this embodiment) 120b are provided. The front surface panel 120 and the back surface panel 122 are structured so as to be secured by screws. Accordingly, a part of the body 12 is formed by securing the front surface panel 120 and the back surface panel 122 with the screws such that the bottom surface panel 124 is supported by being sandwiched between the front surface panel 120 and the back surface panel 122.

It is noted that the cover 120c is fit into the front surface panel 120 so as to cover the portion secured by the screws (see FIG. 1).

On the upper surface panel 120a, switch boards 24 and 26 having a different size are provided, and these switch boards 24 and 26 are fixedly arranged (housed) at predetermined positions of the upper surface panel 120a. Although omitted in FIG. 2, each of the switch boards 24 and 26 has two contacts (24a, 24a and 26a, 26a) (see FIG. 4).

On each of the switch boards 24 and 26, two rubber switches 28 are arranged, and the respective rubber switches 28 are joined to edges of depressing protrusions 32c and 34c described later. Although omitted in FIG. 2, on the rear surface of the rubber switch 28, a contact 28a is provided, and each rubber switch 28 is provided at a position opposed to each of the contacts (24a, 24a, 26a, 26a) of the switch boards 24 and 26 (see FIG. 4).

On the respective rubber switches 28, a lid 30 of the first housing 14 is provided, and this is attached on the front surface panel 120 so as to cover the upper surface panel 120a, the switch boards 24, 26, and the rubber switches 28. The lid 30 is provided with five holes 30a that engaging protrusions 32*b* and 34*b* described later penetrate, and four holes 30*b* that the rubber switches 28 arranged at the positions opposed to the depressing protrusions 32*c* and 34*c* penetrate.

Figure 3:
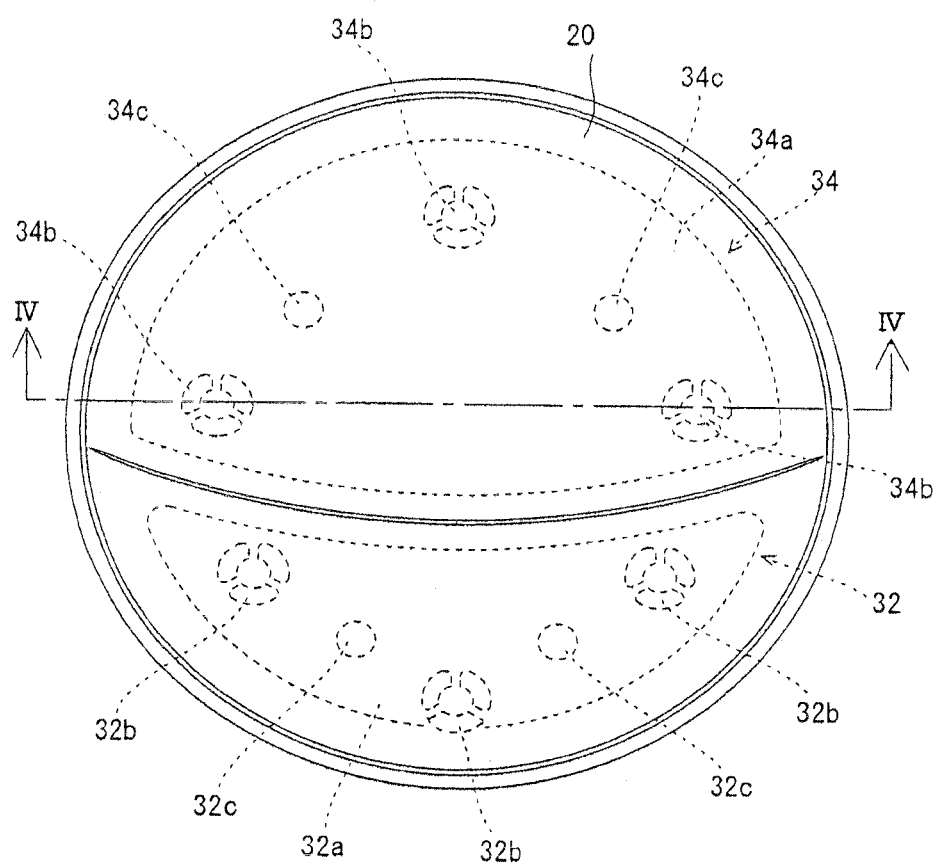
FIG. 3 is a view when viewing from above a part of the operating apparatus for a game machine shown in FIG. 1.
Figure 4:
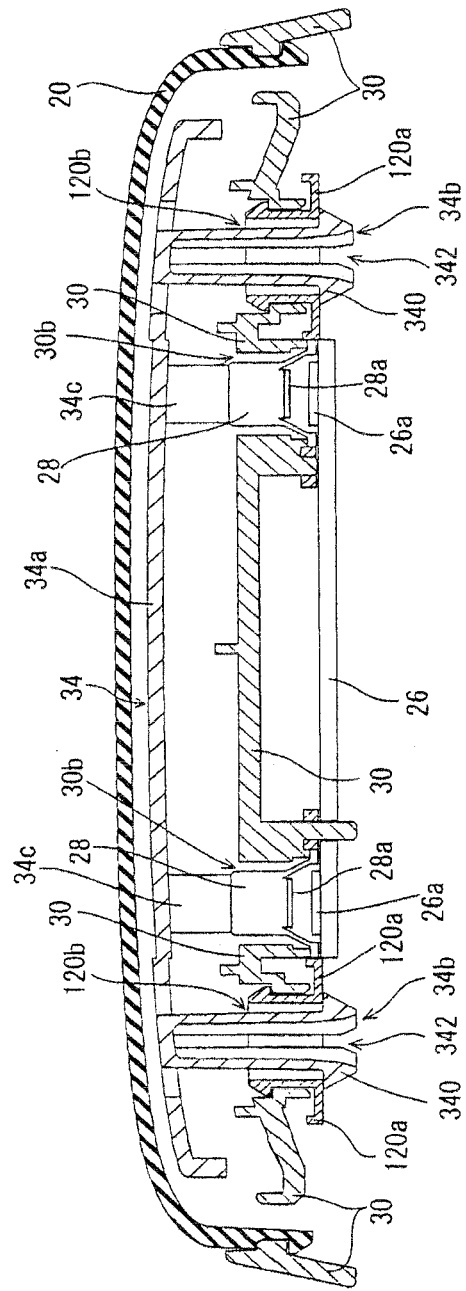
FIG. 4 is a part of a cross-sectional view of a part of the operating apparatus for a game machine shown in FIG. 3.

On the lid 30, depressing members 32 and 34 having a different size are provided, and over this, the cover 20 to be attached to the lid 30 is further provided. As shown in FIG. 3, and FIG. 4 being a part of a cross-sectional view IV-IV of FIG. 3, the depressing portion 32 has its main body 32*a* in the form of a crescent, and is provided with three engaging protrusions 32*b* and two depressing protrusions 32*c* that downwardly protruded from the main body 34*a*. Furthermore, the depressing member 34 has its main body 34*a* in the form of a dichotomy, and is provided with three engaging protrusions 34*b* and two depressing protrusions 34*c* that are downwardly protruded from the main body 34*a*.

FIG. 3 is a view when viewing the first housing 14 and the cover 20 from directly above. The engaging protrusions 32*b*, the depressing protrusions 32*c*, the engaging protrusions 34*b* and the depressing protrusions 34*c* are arranged at positions shown in FIG. 3. As understood from FIG. 3, the three depressing protrusions 32*b* are provided at the edges (both right and left edges and lower edge) of the main body 32*a* of the depressing member 32, and the two depressing protrusions 32*c* are provided between the three engaging protrusions 32*b*. Furthermore, the three engaging protrusions 34*b* are provided at the edges (both right and left edges and upper edge) of the main body 34*a* of the depressing member 34, and the two depressing protrusions 34*c* are provided between the three engaging protrusions 34*b*. In addition, as shown in FIG. 4, the engaging protrusion 34*b* (this is true for the protrusion 32*b*) penetrates the hole 30*a* on the lid 30 and the hole 120*b* on the upper surface panel 120*a* such that its engaging portion 340 provided at the tip end penetrates the upper panel 120*a* (the inside of the first housing 14). It is noted that the lid 30 is attached to the upper surface panel 120*a*, and whereby, the holes 120*b* are formed inside the holes 30*a*. Furthermore, the depressing protrusions 32*c* and the depressing protrusions 34*c* are provided so as to depress the rubber switches 28 arranged within the holes 30*b* of the lid 30. That is, each of the rubber switches 28 is housed within the first housing 14 such that its surface (surface to be connected with the depressing protrusion 32*c* and the depressing protrusion 34*c*) is exposed from the hole (30*b*) of the first housing 14.

It is noted that the tip ends of the depressing protrusions 32*c* and 34*c* are arranged in such a manner as to be brought into contact with the rubber switches 28 as shown in FIG. 4. Or, these may be joined by a fitting structure or an adhesive or the both thereof. Accordingly, the depressing members 32 and 34 are supported by the rubber switches 28. Furthermore, in FIG. 4, the rubber switches 28 are illustrated so as to support with two legs of the depressing member 34. However, this is made to simplify the contacts 26*a* and 28*a*, and the legs of the rubber switch 28 are actually formed like an umbrella so as to surround the contact 26*a* and to cover with it.

In addition, as shown in FIG. 3 and FIG. 4, the engaging protrusion 34*b* (it is true for the engaging protrusion 32*b*) is provided with a notch (slit) 342, and thus, each of the engaging protrusions 32*b* and 34*b* is reduced in diameter when penetrating the hole 120*b*, and then restored when having penetrated the hole 120*b*. Then, the engaging portion 340 is engaged with the rear surface (inner wall of the first housing 14) of the upper surface panel 120*a*. This makes it possible to prevent the depressing members 32 and 34 from being disengaged.

Figure 5:
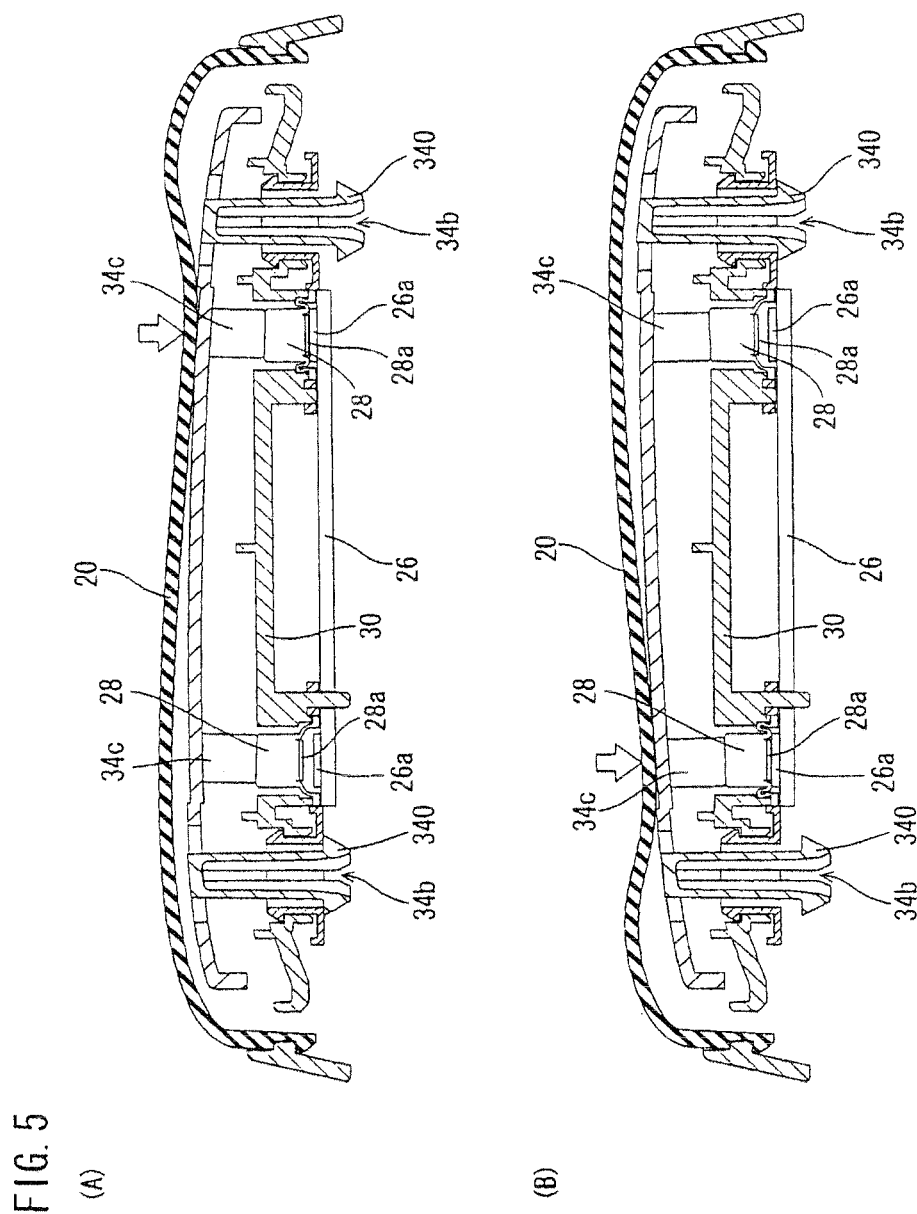
FIG. 5 is a part of the cross-sectional view of the part of the operating apparatus for a game machine shown in FIG. 3 and an illustrative view showing one example of a case that an operation by a player is present.

For example, as shown in FIG. 5 (A), when the player beats the right side of the operating apparatus 10 (cover 20), the cover 20 is elastically changed, and then the right side of the depressing member 34 (this is true for the depressing member 32) is apt to be depressed. At this time, the engaging portion 340 of the engaging protrusion 34*b* provided at the left side of the depressing member 34 is engaged with the rear surface of the upper surface panel 120*a*. This makes it possible to prevent the depressing member 34 from being upwardly actuated. Accordingly, the depressing member 34 at the right side is downwardly actuated, and the rubber switch 28 at the right side is depressed by the depressing member 34*c* so as to be brought into contact with the switch board 26. That is, the contact 26*a* and the contact 28*a* are brought into contact with each other.

Furthermore, as shown in FIG. 5 (B), when the player beats the left side of the operating apparatus 10 (cover 20), the cover 20 is elastically changed, and the left side of the depressing member 34 (this is true for the depressing member 32) is apt to be depressed. At this time, the engaging portion 340 of the engaging protrusion 34*b* provided at the right side of the depressing member 34 is engaged with the rear surface of the upper surface panel 120*a*. This makes it possible to prevent the depressing member 34 from being upwardly actuated. Accordingly, when the depressing member 34 at the left side is downwardly actuated, the rubber switch 28 at the left side is depressed by the depressing member 34*c* so as to bring the contact 28*a* of the rubber switch 28 into contact with the contact 26*a* of the switch board 26.

That is, even if the depressing member 34 (this is true for the depressing member 32) is beaten at any position (area), at least one engaging portion 340 of the engaging protrusion 34*b* (32*b*) except for the engaging protrusion 34*b* provided at the beaten area or in proximity thereto is engaged with the rear surface of the upper surface panel 120*a*. Due to this, when a beating operation by the player is present, the depressing member 34 (32) is depressed, a contact 28*a* of any rubber switch 28 is sure to be brought into contact with the contact 26*a* of the switch board 26 (contact 24*a* of the switch board 24).

More specifically, when the left half area of the operating apparatus 10 (cover 20) shown in FIG. 5 is beaten at any position, the engaging portion 340 of the engaging protrusion 34*b* at the right side of the depressing member 34 is engaged with the rear surface of the upper surface panel 120*a*, the left side of the depressing member 34 is downwardly actuated, the rubber switch 28 at the left side is depressed by the depressing member 34*c*, and the contact 28*a* of the rubber switch 28 is brought into contact with the contact 26*a* of the switch board 26 at the left side. On the contrary thereto, when the right half area of the operating apparatus 10 (cover 20) is beaten at any position, the engaging portion 340 of the engaging protrusion 34*b* at the left side of the depressing member 34 is engaged with the rear surface of the upper surface panel 120*a*, the right side of the depressing member 34 is downwardly actuated, the rubber switch 28 at the right side is depressed by the depressing member 34*c*, and the contact 28*a* of the rubber switch 28 is brought into contact with the contact 26*a* of the switch board 26 at the right side. Furthermore, when the center area of the operating apparatus 10 (cover 20) is beaten at any position, the depressing member 34 is approximately uniformly depressed at both the right and left sides, the rubber switches 28 at the right and the left sides are depressed by the depressing members 34*c*, and thus, both of the contacts 28*a* of the rubber switches 28 are brought into contact with the contacts 26*a* of the switch boards 26.

Owing to the structure of this apparatus, even if the cover 20 and the depressing member 34 (32) have a large area, and even if the operating apparatus 10 (cover 20) is beaten at any place (area), by merely preparing a relatively small number of rubber switches (for example, one for each of the right and the left), any one of the rubber switches is sure to be depressed. This makes it possible to output the same operation signal.

Figure 6:
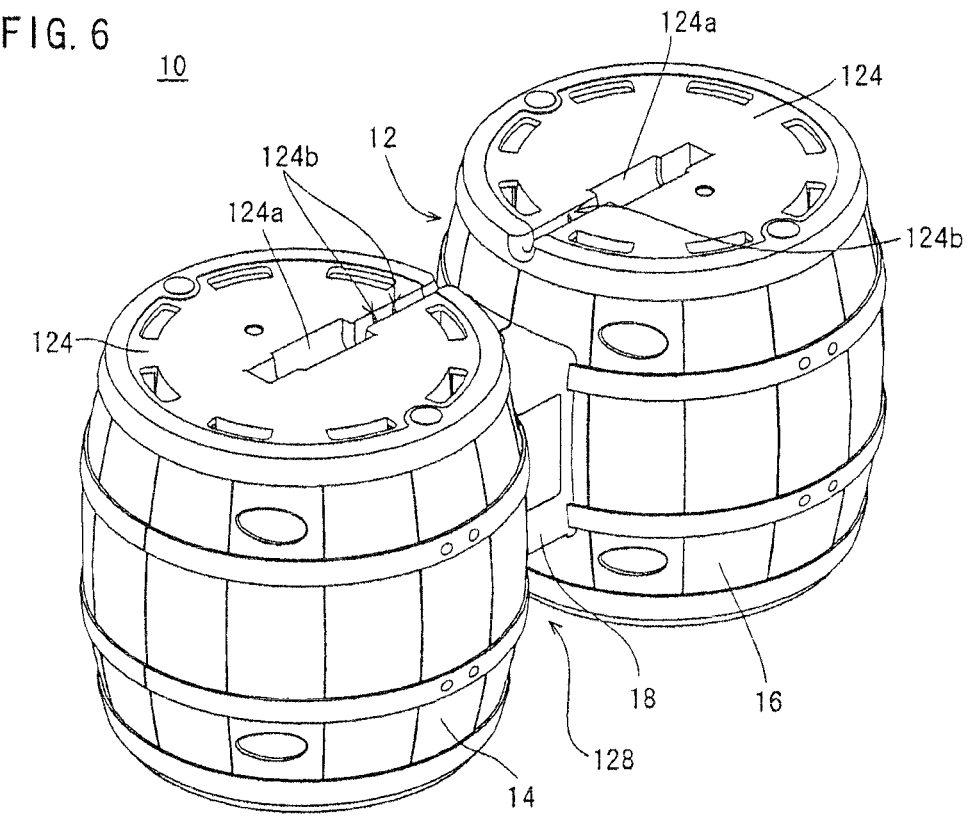
FIG. 6 is a perspective view when viewing from obliquely above a rear surface of the operating apparatus for a game machine shown in FIG. 1.
Figure 7:
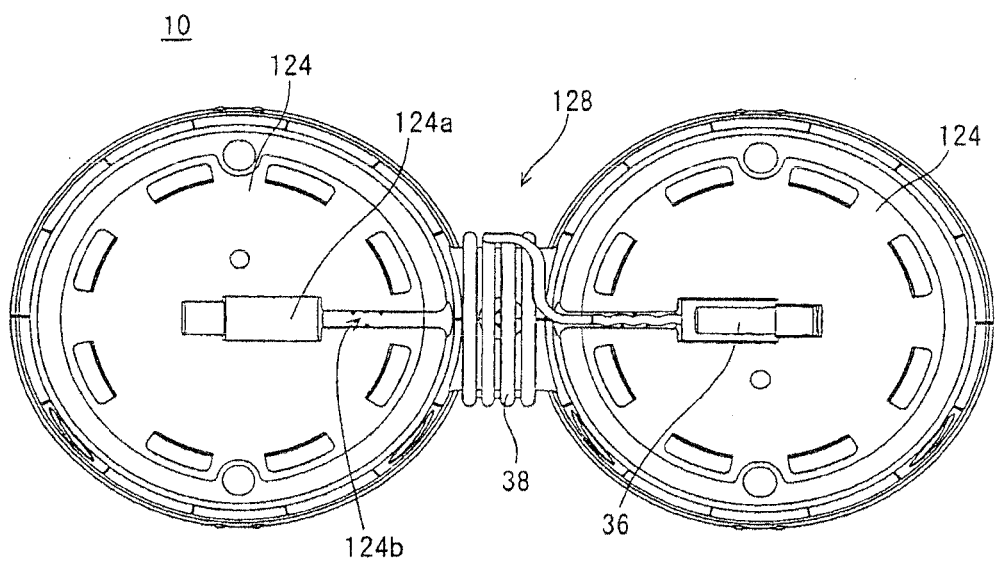
FIG. 7 is a rear surface view of the operating apparatus for a game machine shown in FIG. 1.

FIG. 6 is a perspective view of the rear surface of the operating apparatus 10 when viewed from obliquely above. Referring to FIG. 6, on the rear surface or the bottom surface panel 124 of the operating apparatus 10, a housing concave portion 124a for housing a connector 36 (plug) for connecting the operating apparatus 10 to the game machine 100 and a part of a cable 38 (see FIG. 8) are formed. On the housing concave portion 124a, a plurality of pinch protrusions 124b (three, in this embodiment) are formed at a (part) position where the cable 38 is housed. More specifically, as shown in FIG. 7, the pinch protrusions 124b are arranged so as to be shifted from each other on both sides of the housing concave portion 124a. As shown in FIG. 1, the third housing 18 is formed so as to be smaller than the first housing 14 and the second housing 16, and the difference in size produces a housing concave portion (narrow part of the operating apparatus 10) 128 between the first housing 14 and the second housing 16.

It is noted that one end of the cable 38 is connected to the plug 36, and the other end of the cable 38 is connected to a mounting board housed within the housing 18.

As shown in FIG. 6 and FIG. 7, in the first embodiment, the housing concave portion 124a is provided at the bottom surface panels 124 of both housings 14, 16. Alternatively, the housing concave portion 124a is provided at the bottom surface panel 124 of the only one housing.

Accordingly, when the operating apparatus 10 is not used, the cable 38 is wrapped around the narrow part 128, that is, the third housing 18, and a part of the cable 38 and the plug 36 can be housed within the housing concave portion 124a as shown in FIG. 7. At this time, a part of the cable 38 is pinched by the pinch protrusions 124b as if it snakes, so that a force to restore to an original shape of the cable 38 works to hold the cable 38 in place. This makes it possible to prevent the part of the cable 38 and the plug 36 from being disengaged from the housing concave portion 124a. That is, it is possible to house the cable with a simple structure. Thus, the plug 36 and the cable 38 are housed and held within the housing concave portions 124a and 128, so that the plug 36 and the cable 38 do not protrude from the operating apparatus 10, capable of preventing the operating apparatus 10 from being bulky. That is, it is possible to efficiently house the plug and the cable. The housing concave portions 124a are provided on the rear surface of the operating apparatus 10, that is, the bottom surface of the first housing 14 and the second body 16, so that when using the operating apparatus 10 to be described later, the housing concave portion 124a is inconspicuous.

Figure 8:
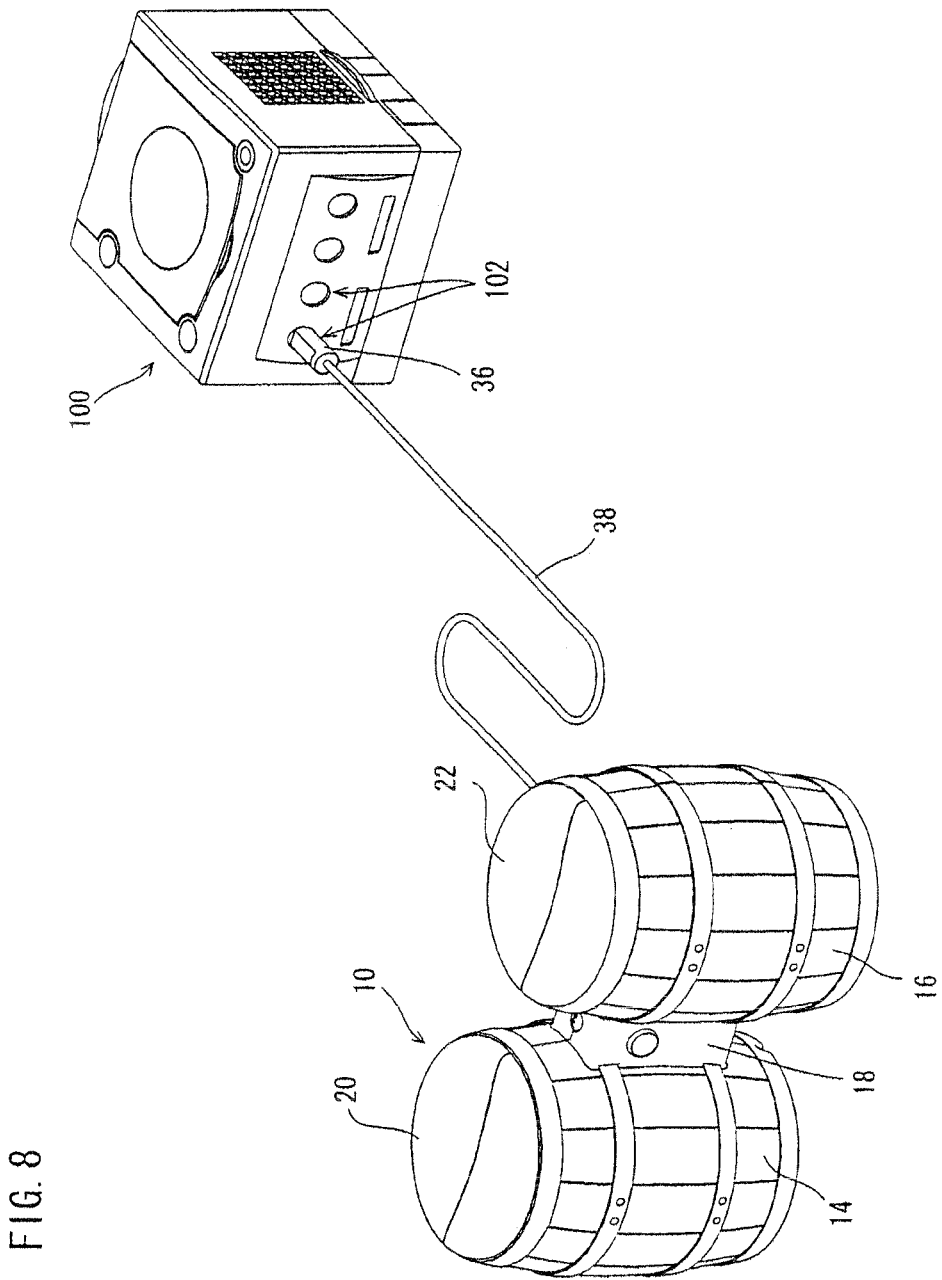
FIG. 8 is an illustrative view showing one example of a state in which the operating apparatus for a game machine shown in FIG. 1 is used.

On the contrary thereto, when using the operating apparatus 10, as shown in FIG. 8, the plug 36 and a part of the cable 38 are disengaged from the housing concave portion 124a, the other part of the cable 38 is untied from the narrow part 128, and then, the plug 36 is inserted (connected) into a connector 102 provided at the front surface panel of the game machine 100. Although not illustrated, the game machine 100 is connected to a television receiver, and so on by an AV cable, and therefore, a game screen to be executed by the game machine 100 is displayed on the television receiver, and music, a sound (sound effect) to be played in the game is output from the speaker.

For example, the player beats the operating apparatus 10, that is, the first operation input portion and the second operating portion according to the guide of the game screen and the music (sound) of the game, and generates a sound such as clapping, a voice, or the like toward the microphone 62, and so forth. Then, an operation signal in response to the beating operation and a sound generation operation signal in response to the generation of the sound are output to the game machine 100. This makes it possible to select the kind of the game, to start the game, to play the game, and so forth.

Figure 9:
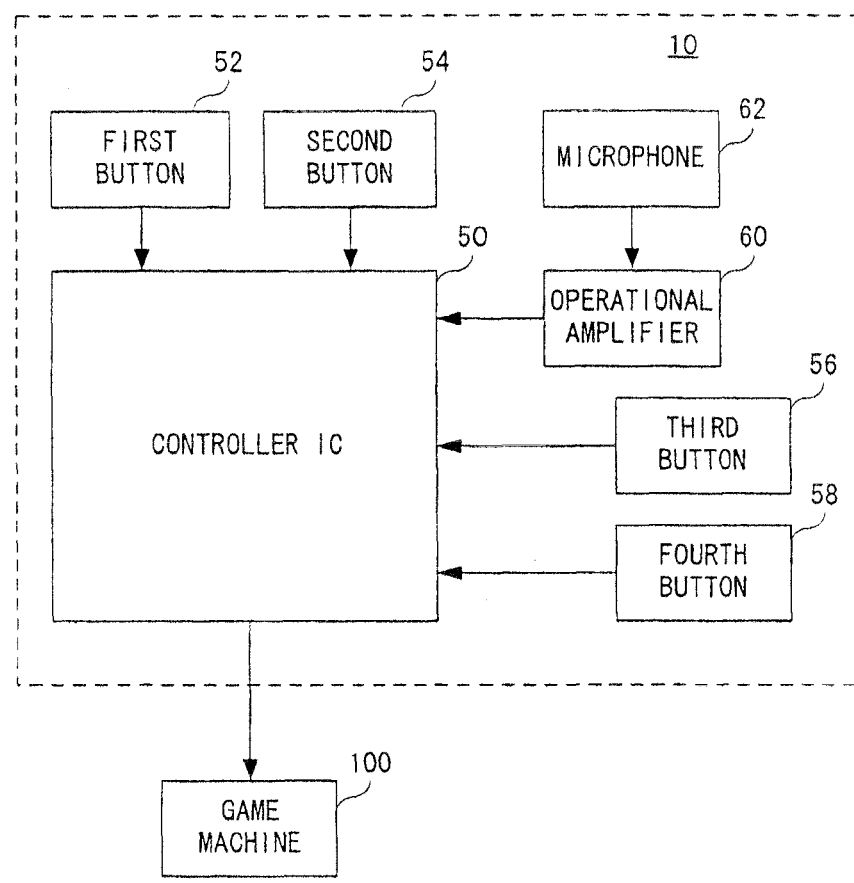
FIG. 9 is a block diagram showing an electric configuration of the operating apparatus for a game machine shown in FIG. 1.

FIG. 9 shows an electric configuration of the operating apparatus 10. Referring to FIG. 9, the operating apparatus 10 includes a controller IC 50, and the controller IC 50 is connected with a first button 52, a second button 54, a third button 56, and a fourth button 58. The end of the cable 38 described above, to which the plug 36 is not connected, is connected to the controller IC 50. Accordingly, as shown in FIG. 8, by inserting the plug 36 into the connector 102 of the game machine 100, the controller IC 50 is electrically connected to the game machine 100 as shown in FIG. 9. Furthermore, the controller IC 50 is connected with the microphone 62 via an operational amplifier 60.

The first button 52 and the second button 54 are provided within the first housing 14, and in this embodiment, the first button 52 consists of the switch board 24 and two rubber switches 28 provided on the switch board 24 (being opposed thereto). The second button 54 consists of the switch board 26 and two rubber switches 28 provided to be opposed to the switch board 26.

The third button 56 and the fourth button 58 are provided within the second housing 16. In this embodiment, the third button 56 is constructed similarly to the first button 52, and the fourth button 58 is constructed similarly to the second button 54.

Thus, in this operating apparatus 10, the player can perform various operations by using any one of the first button 52-the fourth button 58 or a combination of two or more thereof. In response to the beating operation by the player, a state signal indicative of an on/off state of the first button 52-the fourth button 54 is input to the control IC 50. Then, an operation signal corresponding to the beating operation is output to the game machine 100 from the controller IC 50.

In the operating apparatus 10, when the player generates a sound by clapping or a voice, the sound is input to the microphone 62, amplified in the operation amplifier 60, and then, input to the controller IC 50. Thus, the operation signal according to the generation of the sound is output from the controller IC 50 to the game machine 100.

Thus, the player can not only perform a beating operation but also perform a sound operation (play a sound) such as clapping, a voice, and so on during the beating operation, and this extends the range of an operation, capable of realizing more complex and interesting operations.

It is noted that the controller IC 50 is mounted on the mounting board, and the mounting board is, as described above, attached to the third housing 18. The switch boards 24 and 26 attached to each of the first housing 14 and the second housing 16 are subjected to a wire connection with the mounting board, and whereby, the respective buttons 52-58 are electronically connected to the controller IC 50.

FIG. 10 shows one example of a format of the operation signal output from the controller IC 50 to the game machine 100. It is noted that the operation signal has a format corresponding to a standard controller of the game machine 100 ("GAME CUBE" (trade name) that is manufactured/marketed by the assignee of the present invention in this embodiment). Although not illustrated, the controller is provided with two analog joysticks (control stick and C stick), a cross key, an A button, a B button, an X button, a Y button, a Z button, an L trigger button, an R trigger button, and a START/PAUSE button, and so on.

As understood from FIG. 10, the operation signal consists of 8 bytes. As to the first byte (1st byte), data of "0", "0", "ORG_CH", "START", "Y", "X", "B", and "A" are written into bit 7 (b7) to bit 0 (b0), respectively. Bit 7 and bit 6 are fixed values of "0." The data indicative of an on/off state of the setting mode "ORG_CH" is written into bit 5. In this embodiment, if the setting mode "ORG_CH" is turned on, "1" is written, and if the setting mode "ORG_CH" is turned off, "0" is written. Herein, the "ORG_CH" is a variable for setting a mode (setting mode) determining whether or not the standard position (original point (neutral position) of the joystick) is reset. Data indicative of an on/off state of the START button, the Y button, the X button, the B button, and the A button are respectively written into bit 4-bit 0. In this embodiment, if the button is turned on, "1" is written into the relevant bit, and if the button is turned off, "0" is written into the relevant bit.

As to the second byte (2nd byte), data of "FIN", "L", "R", "Z", "UP", "DOWN", "RIGHT", and "LEFT" are written into bit 7 (b7)-bit 0 (b0), respectively. Data indicative of an on/off state of a mode "FIN" for identifying a controller is written into bit 7. In this embodiment, when a standard controller is present, "1" indicative of the on state is written, and when the operating apparatus 10 (percussion musical instruments shape controller) is present, "0" indicative of the off state is written. Into bit 6-bit 0, data indicative of an on/off state of the L trigger button, the R trigger button, the Z button, the UP button, the DOWN button, the RIGHT button, and the LEFT button are respectively written. The data values to be written to the respective bits are the same as in the above-described Y button, and so on.

It is noted that the UP button, the DOWN button, the RIGHT button, and the LEFT button correspond to the respective buttons of the cross key.

Into the third byte (3rd byte), data indicative of an amount of inclination of the control stick toward an X direction is written by binary data utilizing 8 bits in all. Accordingly, the inclination toward the X direction is represented by numerals in the "00000000" ("0" in a decimal numeral)-"11111111" ("255") range. For example, if the control stick is inclined to the left, it is close to "0", and if the control stick is inclined to the right, it is close to "255".

It is noted that in a default setting, the neutral position is represented by "128 (0100000)", and if the value is smaller than this, it is shown that the control stick is inclined toward the left direction, and if the value is greater than this, it is shown that the control stick is inclined toward the right direction. The amount of the inclination can be detected by a difference between the obtained data value and the data value at the neutral position.

Into the fourth byte (4th byte), data indicative of an amount of inclination of the control stick toward a Y direction is written by binary data utilizing 8 bits in all. Accordingly, the inclination toward the Y direction is also represented by numerals in the "00000000" ("0" in a decimal numeral) to "11111111" ("255") range. For example, if the control stick is downwardly inclined, it is close to "0", and if the control stick is upwardly inclined, it is close to "255".

It is noted that in a default setting, the neutral position is represented by "128 (0100000)", and if the value is smaller than this, it is shown that the control stick is downwardly inclined, and if the value is greater than this, it is shown that the control stick is upwardly inclined. The amount of the inclination can be detected by a difference between the obtained data value and the data value at the neutral position.

Into the fifth byte (5th byte), data indicative of an amount of inclination of the C stick toward an X direction is written by binary data utilizing 8 bits in all. Furthermore, into the sixth byte (6th byte), data indicative of an amount of inclination of the C stick toward a Y direction is written by binary data utilizing 8 bits in all. These data value is decided similarly to the above-described control stick.

Into the seventh byte (7th byte), data indicative of an amount of the depression of the L trigger button is written by binary data utilizing 8 bits in all. The data value when the L trigger button is not depressed is "00000000", and the data value is rendered greater in accordance with the amount of the depression. That is, the data value when depressed at the maximum renders "11111111".

Into the eighth byte (8th byte), data indicative of an amount of the depression of the R trigger button is written by binary data utilizing 8 bits in all. The data value is decided similarly to the above-described L trigger button.

The format of the operation signal is shown like this; the operating apparatus 10 is not provided with the joystick, the Y button, the X button, the B button, and the A button, but it alternately outputs to the game machine 100 an operation signal indicative of an on/off state of the first button 52-the fourth button 58, an operation signal in response to a generation of the sound to the microphone 62, and a controller identifying mode, and therefore, the data of the first byte to the third byte are utilized, for example. More specifically, with respect to the first byte, data indicative of an on/off state of the first button 52 is written to bit 3, data indicative of an on/off state of the second button 54 is written to bit 2, data indicative of an on/off state of the third button 56 is written to bit 1, and data indicative of an on/off state of the fourth button 58 is written to bit 0. Furthermore, data "0" for identifying the operating apparatus 10 (percussion musical instruments shape controller) is written to bit 7 of the second byte. In addition, data indicative of the presence or absence of a sound input to the microphone 62 is written to bit 0 of the second byte. It is noted that bit 0 needs not be used, and any one of bit 6-bit 0 is appropriate to be used. This is because the operating apparatus 10 is not provided with the L trigger button, the R trigger button, the Z button, and the cross key. Or, in place of outputting the presence or absence of the sound input, data of loudness of the sound (volume) may be output to the game machine 100. In this case, the data value ("00000000"-"11111111") corresponding to the volume is written to the third byte.

It is noted that although not illustrated, the operating apparatus 10 is provided with a START/PAUSE button, and therefore, the data indicative of an on/off state is written to bit 4 of the first byte.

In the first embodiment, the controller IC 50 used for the standard controller is adopted, and therefore, by changing the on/off state of the controller identifying mode "FIN", it becomes possible to determine whether the controller is the standard controller or the operating apparatus 10 (percussion musical instruments shape controller) in the game machine 100, and this allows the format described by use of FIG. 10 to be used for the operating apparatus 10. Alternatively, it is enough to transmit the data of the first byte and the third byte as described above in this embodiment, and therefore, it may be possible that another controller IC is developed in addition to the controller IC 50 so as to be adopted.

Furthermore, a circuit for setting a threshold (sensitivity) of a loudness of a sound to be input to the microphone 62 is provided to the controller IC 50, and when the loudness of the sound to be input is equal to or more than a threshold value, the input sound data is rendered valid, and when it is equal to or less than the threshold value, the input sound data is rendered invalid. This makes it possible to effectively prevent a noise about the environment, and the like from being input erroneously. Furthermore, a sensitivity adjustment knob constructed of a variable resistor, and so on is provided to the operating apparatus 10, and by operating the sensitivity adjustment knob, the threshold value can be set and changed. This makes it possible to change the threshold value according to the loudness of the noise about the environment to set a proper threshold value, and to effectively prevent the noise about the environment from being input erroneously.

According to the first embodiment, the engaging protrusion is provided to the depressing member, and therefore, at a time of performing a beating operation, the rubber switch is sure to be brought into contact with the switch board without the depressing member being upwardly actuated. That is, it is possible to assuredly perform the input operation. Furthermore, the depressing member is supported by only the rubber switches, allowing the user to operate the operating apparatus with a relatively small load.

In addition, within the housing concave portion provided on the rear surface of the operating apparatus, the pinch protrusions are arranged so as to be shifted from each other on both side surfaces for housing the cable, and therefore, it is possible to prevent the plug and the cable housed from being disengaged from the operating apparatus.

Furthermore, the cable is wrapped around the narrow part of the operating apparatus, and the plug and a part of the cable are housed within the housing concave portion provided on the rear surface of the operating apparatus, capable of preventing the operating apparatus from being bulky. That is, it is easily portable.

In addition, the player can input not only an operation signal in response to the beating operation but also an operation signal in response to a sound, and this extends the range of an operation, capable of realizing more complex and interesting operations.

Figure 11:
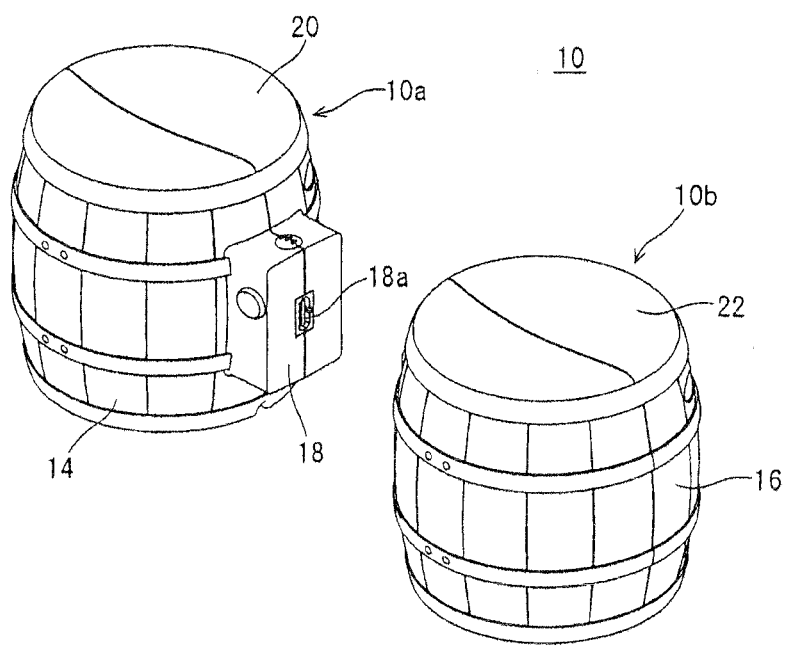
FIG. 11 is an illustrative view showing another example of the operating apparatus for the game machine of the present invention.
Figure 11:
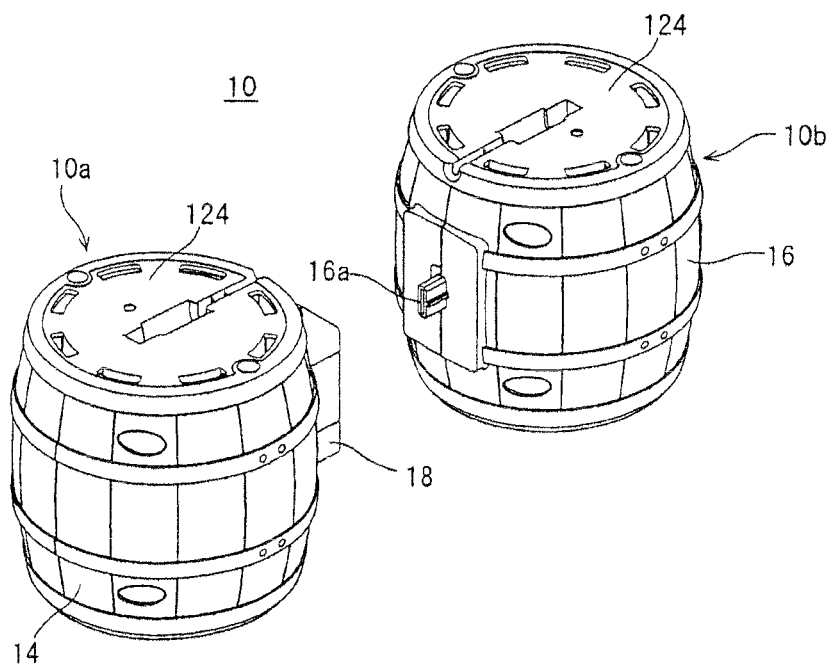

The operating apparatus 10 of the second embodiment shown in FIG. 11 (A) and FIG. 11 (B) is the same as the above-described first embodiment except that the second housing 16 is detachably constructed, and therefore, a duplicate description is omitted. Referring with FIG. 11 (A) and FIG. 11 (B), in the operating apparatus 10 of the second embodiment, the first housing 14 and the third housing 18 are integrally constructed, and the second housing 16 is structured so it can be detached from the third housing 18.

It is noted that FIG. 11 (A) is a perspective view showing the operating apparatus 10 when viewing the upper surface of the operating apparatus 10 from obliquely above, and FIG. 11 (B) is a perspective view showing the operating apparatus 10 when viewing the rear surface of the operating apparatus from obliquely above.

Describing the structure in detail, as shown in FIG. 11 (A), on a side surface of the third housing 18, a connector 18a is provided, and as shown in FIG. 11 (B), on a side surface of the second housing 16, a connector 16a to be fitted with the connector 18a is provided.

For example, when the connector 16a of one operating apparatus and the connector 18a of the other operating apparatus are fitted and directly connected with each other, both apparatuses can be used as one operating apparatus similarly to the operating apparatus 10 shown in FIG. 1. As shown in FIG. 11 (A) and FIG. 11 (B), when the connector 16a of one operating apparatus and the connector 18a of the other operating apparatus are detached from each other, both apparatuses can be used as two operating apparatuses (for the sake of clear understanding, the operating apparatus 10a and the operating apparatus 10b). It is noted that in the case of separately utilizing the operating apparatus 10a and the operating apparatus 10b, by indirectly connecting the operating apparatus 10a and the operating apparatus 10b, an operation signal of the operating apparatus 10b, that is, a state signal indicative of an on/off state of the third button 56 and the fourth button 58 needs to be input to the controller I/C 50.

Figure 12:
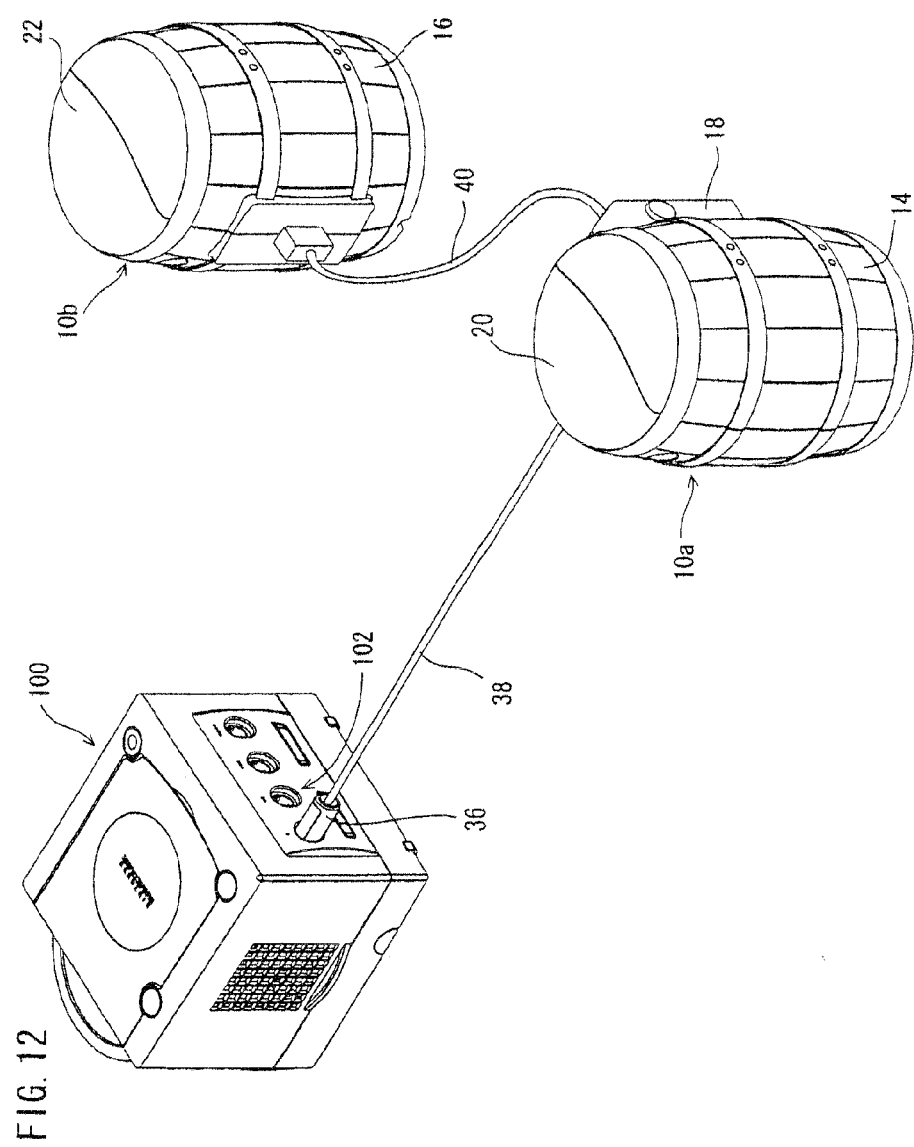
FIG. 12 is an illustrative view showing one example of a state in which the operating apparatus for a game machine shown in FIG. 11 is used.

Accordingly, in the second embodiment, as shown in FIG. 12, a connecting cable 40 having connectors that are detachably connected to the respective connectors 16a and 18a is utilized. It is noted that although a description of a detailed shape of the connectors provided to the connecting cable 40 is omitted, it is appropriate that connectors having the same shape as the connectors 16a and 18a are used. Thus, by indirectly connecting the second housing 16 and the third housing 18 with use of the connecting cable 40, the third button 56 and the fourth button 58 are electrically connected to the controller IC 50.

It is noted that although in the second embodiment, the second housing 16 and the third housing 18 are electrically connected by use of the cable, there is no need to be restricted thereto. That is, another method such as connecting via an electromagnetic wave (for example, electric wave or infrared rays) in a wireless manner may be applied.

Although not illustrated, the structure, and etc. of the depressing members 32 and 34, and the like that is provided between the upper surface panel 120a and the cover 20 (22) are the same as that in the first embodiment. Accordingly, it is possible for the player to assuredly input a beating operation with a relatively small load.

Similarly, although not illustrated, in a case where the operating apparatus 10 is not used, the second housing 16 and the third housing 18 are directly connected, the cable 38 is wrapped around the narrow part 128, that is, the third housing 18 formed between the first housing 14 and the second housing 16, and the plug 36 and a part of the cable 38 are housed within the housing concave portion 124a. This allows the operating apparatus 10 to be easily portable without being bulky as in the first embodiment.

Figure 13:
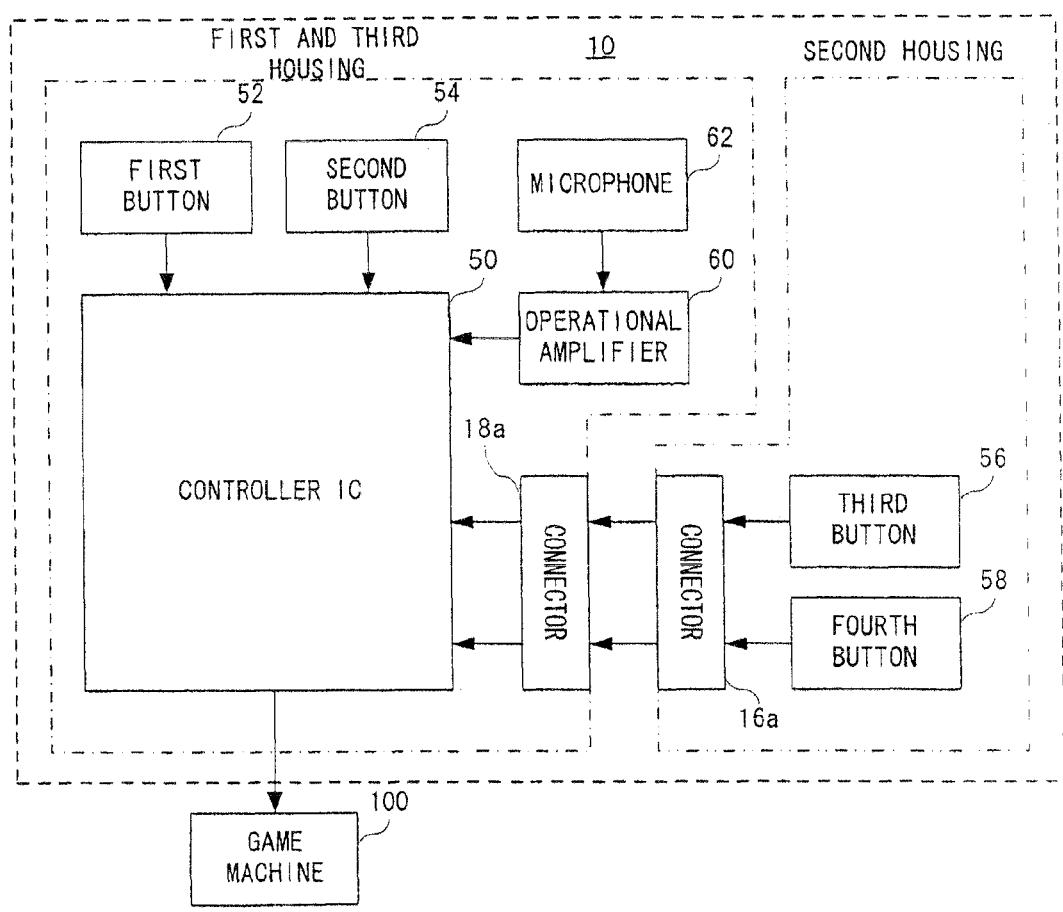
FIG. 13 is a block diagram showing an electric configuration of the operating apparatus for a game machine shown in FIG. 11.

In the second embodiment, an electric configuration of the operating apparatus 10 is shown in FIG. 13. Referring to FIG. 13, the connector 18a is provided to the operating apparatus 10a, and the connector 16a is provided to the operating apparatus 10b as described above. The connector 16a and the connector 18a are directly connected with each other. Or, the connector 16a and the connector 18a are connected with each other by the connecting cable 40. These configurations make it possible to electrically connect the third button 56 and the fourth button 58 to the controller IC 50.

It is noted that the structure and the operation except for the above-description is the same as that in the first embodiment, and therefore, a duplicate description is omitted.

According to the second embodiment, the operating apparatus can be divided so as to be used as two operating apparatuses, and therefore, even if two players enjoy playing a game, each player's ability to operate is not reduced.

It is noted that in the second embodiment, by connecting the second housing 16 and the third housing 18 with the cable, a beating operation signal from the operating apparatus 10b can be input. However, if a controller IC independent of the controller IC 50 is prepared to the second housing 16, the operating apparatus 10b can be directly connected to the game machine 100. In this case, by electrically or mechanically determining whether the operating apparatus is used as one operating apparatus or two operating apparatuses, any one of the controller ICs has to be activated/disabled, resulting in difficulty of control. Furthermore, another problem is that the operating apparatus is expensive.

In addition, in the first embodiment and the second embodiment, only a case in which the operating apparatus 10 is used by being connected to the game machine 100 is described. However, if the operating apparatus 10 is integrally provided with a storage medium (ROM) for storing a game program and so on, a memory, and a CPU for processing a program of a game program and so on, it is possible to enjoy playing a game by directly connecting the operating apparatus 10 to a television receiver.

Figure 14:
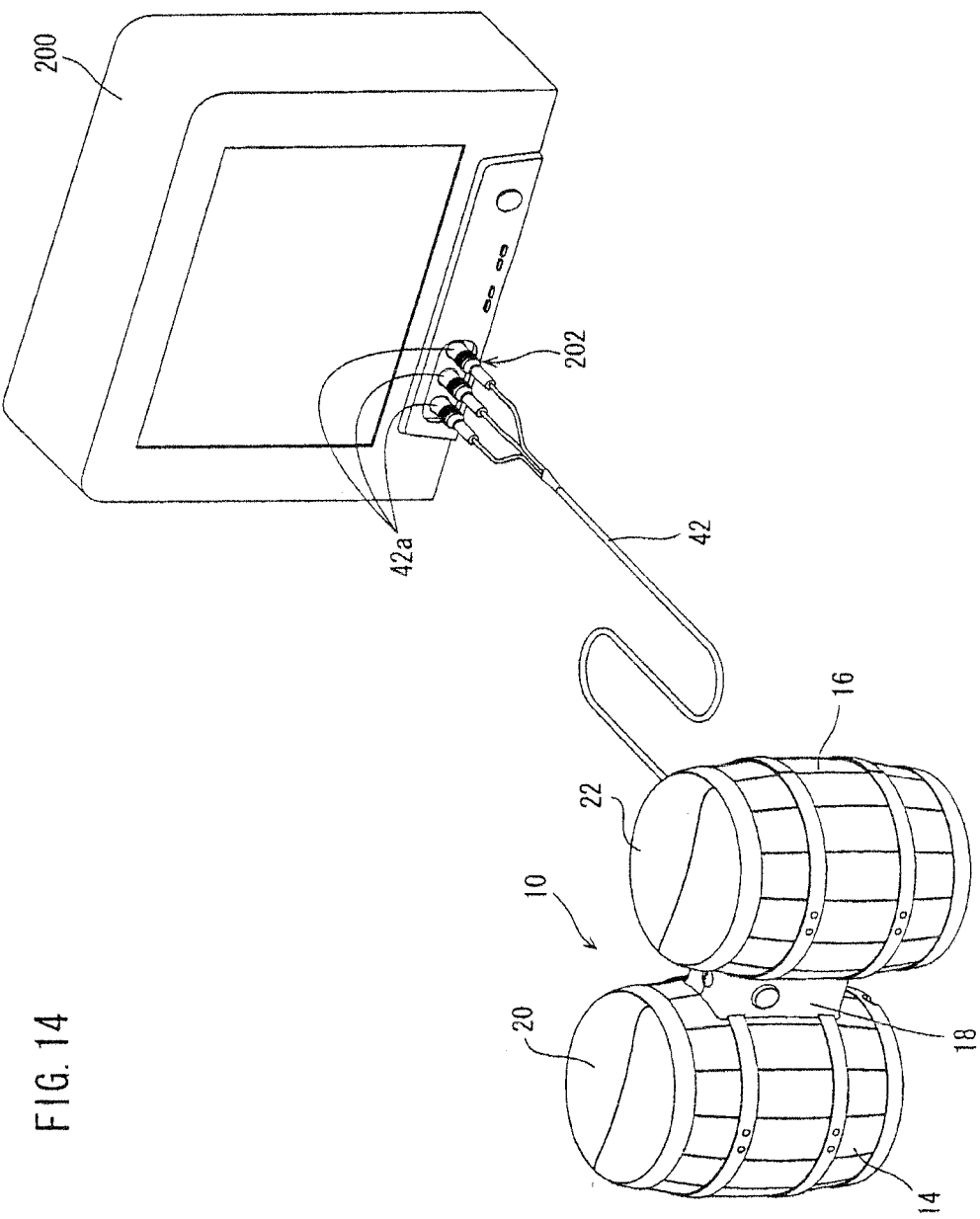
FIG. 14 is an illustrative view showing the other example of the operating apparatus for a game machine of the present invention.

In this case, as show in FIG. 14, for example, an AV cable 42 extends from the operating apparatus 10 (third housing 18), and plugs 42a that are provided at the tip end thereof and relate to an image and a sound are connected to AV terminals 202 of a television receiver 200.

Although not illustrated, the shape of the housing concave portion 124 is also changed so as to house the AV cable 42. That is, the AV cable 42 is provided with one plug for image and two plugs for sound, and therefore, a housing concave portion for separately housing the respective plugs and a housing concave portion for separately housing the respective connecting cables connected with the respective plugs need to be formed. In addition, each of the housing portions for cable is provided with the pinch protrusions described above on both side surfaces thereof.

It is noted that as shown in the second embodiment, it is needless to say that this is applied to a case in which the second housing 16 is structured so as to be detachable from the third housing 18. In this case, for example, it is appropriate that the above-described ROM, memory, CPU and so on may be provided within the first housing 14.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A reconfigurable operating apparatus to be used by being connected to a game machine, comprising:
    a first housing provided with a first operation input portion on its main surface;
    a second housing provided with a second operation input portion on its main surface;
    a first connector formed in said first housing;
    a second connector that is detachably connected to said first connector and is formed on said second housing;
    a detector to detect if said first connector is directly or indirectly connected to said second connector,
    wherein said first housing and said second housing are configurable as one operating apparatus for the game machine to control a first player's game input when said detector detects that said first connector and said second connector are directly connected with each other, and
    wherein said first housing and said second housing are configurable as two separate independently operable operating apparatuses for the game machine to respectively receive a first player's and a second player's game input when said detector detects that said first connector and said second connector are indirectly connected.

2. An operating apparatus according to claim 1, further comprising:
    a first cable connected to the inside of said first housing at one end and having a third connector to be connected to said game machine at the other end;
    a second cable detachably connected to said second connector at one end and having a connector to be connected to said first connector at the other end, wherein,
    when said first housing and said second housing are used separately as two operating apparatuses for the game machine, said second cable is detachably connected to said second connector.

3. An operating apparatus according to claim 1, wherein
    said first housing and said second housing are configurable as one operating apparatus for the game machine to control a first player's game input when said detector detects that said first connector and said second connector are directly connected and in physical contact with each other, and
    said first housing and said second housing are configurable as two separate operating apparatuses for the game machine to respectively receive a first player's and a second player's game input when said detector detects that said first connector and said second connector are indirectly connected to one another using a cable.

4. An operating apparatus according to claim 1, further comprising:
    a main housing;
    wherein the first operation input portion is a percussion operation input portion that is provided on one main surface of said main housing and is elastically changeable according to an operation by an operator;
    wherein the second operation input portion is a sound input portion provided on an area different from an area provided with said percussion operation input portion of said main housing, the sound input portion being provided for inputting a sound generated by the operator and unassociated with the striking of any elastically changeable percussion input portion; and further comprising:
    an operation signal transmitting mechanism for transmitting to said game machine an operation signal to be output in response to the operation at said percussion operation input portion and the sound generating operation signal to be output in response to a sound input by said sound input portion, and wherein
    the operating apparatus being detachably connected to the game machine.

5. An operating apparatus according to claim 4, wherein the sound input portion is a non-contact sound input portion.

6. An operating apparatus according to claim 4, wherein the sound input portion is configured to capture a clapping sound.

7. An operating apparatus according to claim 4, wherein the percussion operation input portion that is provided on the one main surface of said main housing is a musical percussion operation input portion.

8. An operating apparatus according to claim 4, further comprising at least one user-depressible button.

9. An operating apparatus according to claim 4, wherein the at least one user-depressible button is shaped and arranged to respond to non-percussion operation inputs.

10. An operating apparatus according to claim 4, wherein the percussion operation input portion is structured to simulate a drum or conga head.

11. A game-playing system according to claim 1, further comprising:
    a main housing;
    wherein the first operation input portion is a percussion operation input portion that is provided on one main surface of said main housing and is elastically changeable according to an operation by an operator;
    wherein the second operation input portion is a sound input portion provided on an area different from an area provided with said percussion operation input portion of said main housing, the sound input portion being provided for inputting a sound generated by the operator and unassociated with the striking of any elastically changeable percussion input portion; and further comprising:

an operation signal transmitting mechanism for transmitting to said system an operation signal to be output in response to the operation at said percussion operation input portion and the sound generating operation signal to be output in response to a sound input by said sound input portion, wherein the operating apparatus is detachably connectable to the game-playing system.

12. A system according to claim 11, wherein the sound input portion is a non-contact sound input portion.

13. A system according to claim 11, wherein the sound input portion is configured to capture a clapping sound.

14. A system according to claim 11, wherein the percussion operation input portion that is provided on the one main surface of said main housing is a musical percussion operation input portion.

15. A game-playing system comprising a reconfigurable operating apparatus connectable thereto, the reconfigurable operating apparatus comprising:

a first housing provided with a first operation input portion on its main surface;

a second housing provided with a second operation input portion on its main surface;

a first connector formed in said first housing;

a second connector that is detachably connected to said first connector and is formed on said second housing;

a detector to detect if said first connector is directly or indirectly connected to said second connector, wherein said first housing and said second housing are configurable as one operating apparatus to control a first player's game input when said detector detects that said first connector and said second connector are directly connected with each other, and wherein said first housing and said second housing are configurable as two separate independently operable operating apparatuses to respectively receive a first player's and a second player's game input when said detector detects that said first connector and said second connector are indirectly connected.

16. A system according to claim 15, wherein the reconfigurable operating apparatus further comprises:

a first cable connected to the inside of said first housing at one end and having a connector to be connected to said system at the other end;

a second cable detachably connected to said second connector at one end and having a connector to be connected to said first connector at the other end, wherein, when said first housing and said second housing are used separately as two operating apparatuses for said system, said second cable is detachably connected to said second connector.

17. A system according to claim 15, wherein:

wherein said first housing and said second housing are configurable as one operating apparatus to control a first player's game input only when said detector detects that said first connector and said second connector are directly connected with each other, and wherein said first housing and said second housing are configurable as two separate operating apparatuses to respectively receive a first player's and a second player's game input only when said detector detects that said first connector and said second connector are indirectly connected.

18. A system according to claim 15, wherein:

wherein said first housing and said second housing are configurable as one operating apparatus to control a first player's game input when said detector detects that said first connector and said second connector are directly connected and in physical contact with each other, and wherein said first housing and said second housing are configurable as two separate operating apparatuses to respectively receive a first player's and a second player's game input when said detector detects that said first connector and said second connector are indirectly connected with each other via a cable.

19. A game-playing system comprising a game-playing device and a reconfigurable operating apparatus connectable thereto, the reconfigurable operating apparatus comprising:

a first housing provided with a first operation input portion on its main surface;

a second housing provided with a second operation input portion on its main surface;

a first connector formed in said first housing;

a second connector that is detachably connected to said first connector and is formed on said second housing;

a detector configured to detect if said first connector is directly or indirectly connected to said second connector, wherein said first housing and said second housing are configurable as one operating apparatus, in response to said detector detecting that said first connector and said second connector are directly connected with each other, and wherein said first housing and said second housing are configurable as two separate, independently operable operating apparatuses, in response to said detector detecting that said first connector and said second connector are indirectly connected.

20. A system according to claim 19, wherein:

said first housing and said second housing are configurable as one operating apparatus to receive input from one user and relay the input received from the one user to the game-playing device, in response to said detector detecting that said first connector and said second connector are directly connected with each other, and said first housing and said second housing are configurable as two separate, independently operable operating apparatuses to receive input from two different users and relay the input received from the two different users to the game-playing device, in response to said detector detecting that said first connector and said second connector are indirectly connected.

* * * * *